United States Patent
Bloom (10) Patent No.: US 7,113,210 B2
(45) Date of Patent: Sep. 26, 2006

(54) INCORPORATING PIXEL REPLACEMENT FOR NEGATIVE VALUES ARISING IN DARK FRAME SUBTRACTION

(75) Inventor: Daniel M. Bloom, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 750 days.

(21) Appl. No.: 10/140,065

(22) Filed: May 8, 2002

(65) Prior Publication Data
US 2003/0210344 A1    Nov. 13, 2003

(51) Int. Cl.
*H04N 9/64* (2006.01)
(52) U.S. Cl. .............. 348/243; 348/241; 348/246; 348/247
(58) Field of Classification Search .......... 348/243, 348/244, 251, 247
See application file for complete search history.

(56) References Cited

U.S. PATENT DOCUMENTS

| | | | | |
|---|---|---|---|---|
| 6,144,408 | A * | 11/2000 | MacLean ................. 348/241 |
| 6,522,355 | B1 * | 2/2003 | Hynecek et al. ........... 348/245 |
| 6,747,696 | B1 * | 6/2004 | Nakata et al. ............. 348/243 |
| 6,888,568 | B1 * | 5/2005 | Neter ..................... 348/222.1 |
| 2003/0133615 | A1 * | 7/2003 | Bern et al. ............... 382/225 |

* cited by examiner

*Primary Examiner*—Lin Ye
*Assistant Examiner*—Anthony J. Daniels (57) ABSTRACT

An apparatus and method of processing images in a digital camera and improving the quality of images produced by camera processing software. In low-light digital camera photography, a dark frame image is subtracted from an original picture image to form a resulting image. The resulting image formed from the dark frame subtraction is evaluated for negative and invalid pixel values. Each negative and invalid pixel value is replaced using a pixel replacement algorithm with appropriate positive values.

17 Claims, 8 Drawing Sheets

INCORPORATING PIXEL REPLACEMENT FOR NEGATIVE VALUES ARISING IN DARK FRAME SUBTRACTION

TECHNICAL FIELD OF THE INVENTION

This invention relates generally to the field of digital camera photography, and more specifically to the reduction of inaccuracies produced by dark frame subtraction used with low-light photography.

BACKGROUND

With the advent of commercial digital cameras, amateur photographers are able to experiment with the digital camera in situations with low light, such as evening or night sky pictures. Some of the best features of the commercial digital camera are that feedback is immediate and that photographers are unconstrained by a finite amount of film.

In low-light conditions, such as dawn, dusk, and night, amateur photographers can capture the dramatic effects of the unique play of light. This requires significantly long exposures which create some issues for digital cameras.

In contrast to traditional film cameras, which use film to capture pictures, digital cameras use electronic sensors such as a charge-coupled device (or CCD) or complementary metal-oxide semiconductor (or CMOS) devices to record all relevant information for each picture. Unlike film, which records visible light exactly as it strikes the film, the image sensor of the digital camera records raw data values where the range [0 ... 4095] corresponds to quantized values of the light levels that strike the image sensor. This is the difference between analog in the traditional film camera, and the digital camera. In this situation, longer exposures are used to take high-resolution pictures in low-light, such as at dusk or night, or simply dark images.

When using long exposures, typically between 0.33 to 4 seconds or greater, depending on the sensor and ambient temperature, the image sensor reveals its inaccuracy. The image sensor records the data of the image through electrons collected via photoelectric conversion in each pixel. Unfortunately, some electrons build up in the pixel sites via other methods such as through metal impurities in the crystal structure and defects in the crystal lattice. In long-exposure night-sky pictures, these generated electrons produce images that resemble stars, and can substantially distort the image. Because this phenomenon is most noticeable under no-light conditions, these generated electrons are called "dark current."

The warmth of the image sensor chip directly influences the of electrons generated; the amount of dark current in each pixel approximately doubles for every 8° C. increase. The amount of dark current is directly related to each pixel site, mostly by levels of defects. Hence, there is a fixed pattern across a sensor at a given temperature and integration time.

When two pictures of pure darkness, such as two pictures with the shutter closed or two pictures taken with the lens cap on, are compared with each other, the pictures will be nearly identical, pixel-by-pixel, aside from low-level variations from other noise sources. Most importantly, the two pictures will have the same amount of dark current at exactly the same pixel sites. When it is known that dark current in a digital camera, dependent on the ambient temperature, is fixed or static and always occurs in the same pixel locations, then the effects of dark current can be easily minimized.

However, the effects of dark current are more complicated than this and cannot be corrected so easily. In a single pixel measured over time, the amount of dark current generated over several frames would follow a Poisson distribution. This variation or uncertainty is called "dark current shot noise." While the fixed pattern noise is easy to subtract, the shot noise is random and may leave noise in the image after subtraction. As the image sensor warms, more electrons are generated and the image recorded by the image sensor becomes noisier and more inaccurate.

Scientific digital cameras and professional astrophotographers use several different techniques to reduce dark current and dark shot noise. One technique to reduce the effects of dark current is to use cryogenic cooling systems. At very cold temperatures, the effects of dark current are almost entirely eliminated. However, rather than employing expensive cryogenic cooling systems on the consumer-grade digital camera, an easier and less expensive solution is currently employed.

Currently, the professional photographer using a digital camera to experiment with low-light photography will take a long-exposure picture and will, at approximately the same time, in order to record dark current of the camera at that ambient temperature, take another picture of darkness, i.e., with the shutter closed or the lens cap on the camera. This second image is called a "dark frame" or a "dark field." The first image consists of a scene plus noise, including dark current, and the second image consists of dark current shot noise. Using a standard image editor, the two images can be subtracted, and the resultant image is the scene with no dark current noise. A disadvantage of this technique is that images received from a digital camera are usually not raw data but instead are usually subject to lossy processing, storage, and compression algorithms. Thus, when two lossy images are processed by the photographer, such as when a dark frame is subtracted from a picture image, then the accuracy of the resulting image is reduced from that of an image produced from the raw data.

Another disadvantage of this technique is that it does not reduce dark shot noise. When, at any given pixel, because of dark shot noise, the output level of the dark frame has a higher value than the output from the actual image, the resulting value from the subtraction is negative. Currently, when the photo editing software used by the professional photographer encounters negative values of data for a scene, the software automatically returns the negative values to zero. This will create inaccurate black spots or speckles called "clipping artifacts" in a picture.

In a picture of a night sky at dusk, for example, a dark blue background has white points of light that can be identified as stars. However, some of these white points of light are actually instances of dark current shot noise. When a dark frame is subtracted from the picture, the white points at the pixels with dark current shot noise are removed. If the random noise of the picture and the dark frame is low, then the dark frame subtraction will yield an accurate picture. However, when the random noise of the picture and the dark frame are combined to induce clipping artifacts, then the picture of the night sky will contain black points in place of the white points of light. While these black points will not be mistaken for stars, they are inaccuracies that detract from the final image.

A dark shot reduction technique of professional astrophotographers is to take multiple dark frame images, usually more than five, average the images pixel-by-pixel, and then subtract the averaged dark frame from the picture to create an image with reduced dark shot noise. While effective, this requires multiple dark frames, which must be taken by the photographer. In addition, that average dark frame is only valid for a given exposure time and temperature, and limits the number of picture images that can be taken by filling the memory of the digital camera. For amateur photographers, a simpler technique that does not limit the number of possible pictures to be taken is required.

There is a need, then, for a camera that will employ dark frame subtraction of only one dark frame before further processing, recognize when the data for an image is negative, and, rather than set that value to zero and thereby introduce spatial noise as a result of dark shot noise, will use value replacement to correct the pixel in place of creating black spots in an image. Typically, pixel replacement algorithms involve using information from neighboring pixels.

SUMMARY

The present invention is directed to an apparatus and method of processing images in a digital camera and improving the quality of images produced by the camera software. In processing low-light photography, the resulting image after a dark frame is subtracted from an original image is evaluated for negative and invalid pixel values. Each negative and invalid pixel value is replaced using a pixel replacement algorithm with appropriate positive values.

DESCRIPTION OF THE DRAWINGS

The features, aspects, and advantages of the present invention will become better understood with regard to the following description, appended claims, and accompanying drawings where:

DETAILED DESCRIPTION

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the spirit and scope of the invention. The present invention is not intended to be limited to the embodiments shown, but is to be accorded the widest possible scope consistent with the principles and features disclosed herein.

The present invention is directed to improvements on existing processing methods of processing low-light images in a digital camera. More particularly, the method evaluates the pixel values of the images to replace negative or illegal pixel values using pixel replacement algorithms, typically using neighboring pixel values. For example, in a low-light image of the night sky at dusk, anomalous white spots in the image formed from incorrect pixel values caused by built-up electrons will be replaced with pixel values appropriate to the image, i.e., dark blue pixel values in the evening sky.

In one embodiment of the present invention, a method for improving the dark frame subtraction algorithm is disclosed. A picture image and a dark frame image are received in digital camera software and the two images are subtracted pixel-by-pixel, the dark frame from the picture image. After the dark frame subtraction, the resulting pixels are evaluated for illegal pixel values, and, where illegal pixels are found, the illegal pixels are replaced with legal pixel values from a pixel replacement algorithm.

Figure 1:
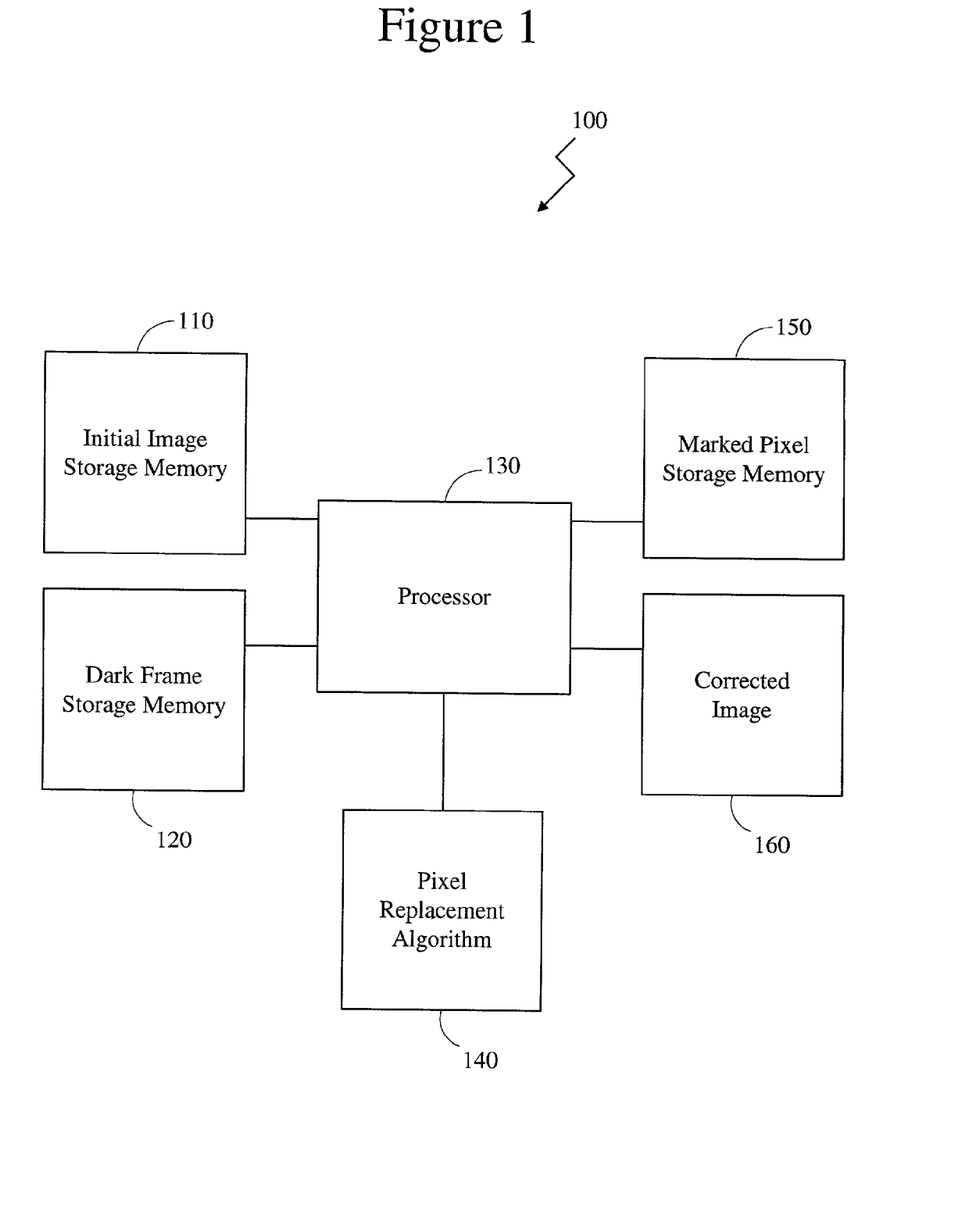
FIG. 1 depicts a bock diagram of one embodiment of the present invention for incorporating pixel replacement in dark frame subtraction.

With reference now to FIG. 1 of the Drawings, there is illustrated therein a block diagram of a system, generally designated by the reference numeral 100, for improving dark frame subtraction. In the embodiment depicted in FIG. 1, a picture image in an initial image memory 110 and a dark frame in an initial dark frame memory 120 are received, processed, analyzed, and corrected in a processor 130 according to a pixel replacement algorithm stored in an algorithm storage 140. A temporary marked pixel storage memory 150 stores marked pixel locations, and the corrected image is then stored in a corrected image memory 160, where the image will be available for further processing.

Figure 2:
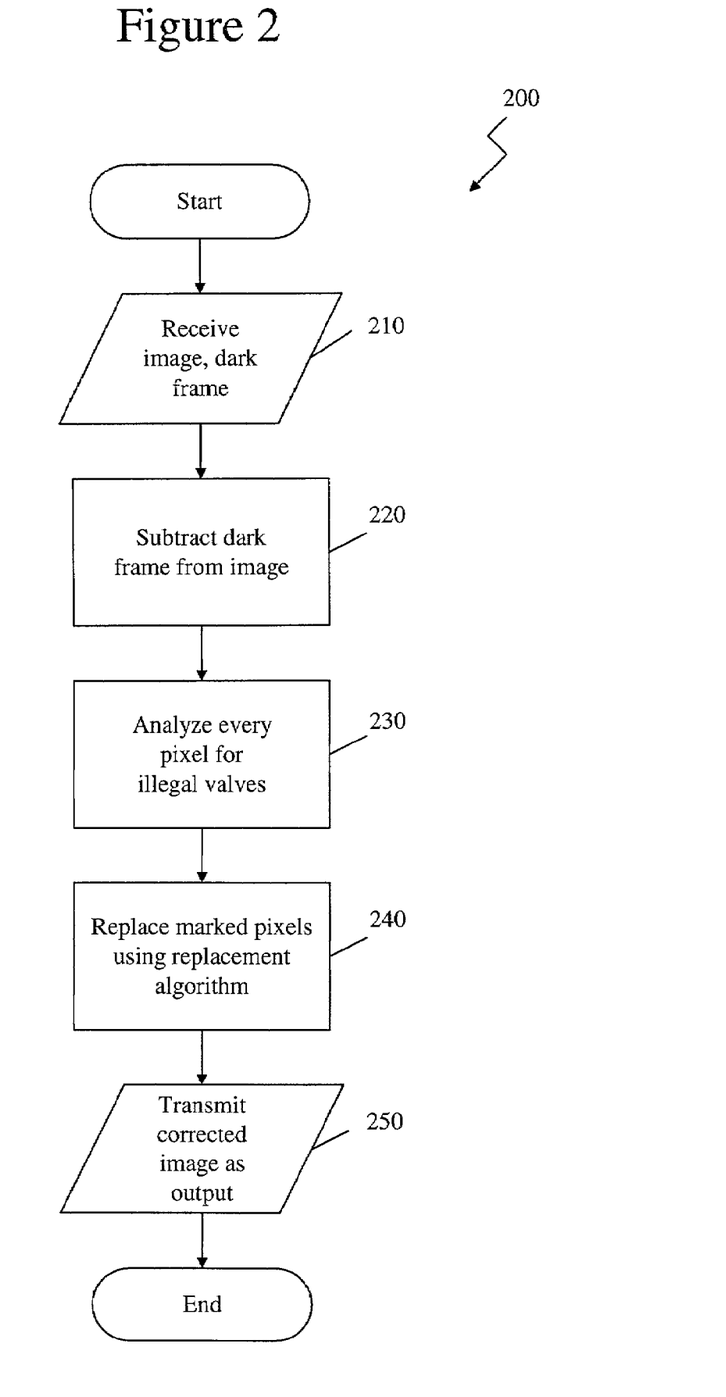
FIG. 2 depicts a schematic flow chart of the methodology of the embodiment of the present invention.

With reference now to FIG. 2, there is illustrated a flowchart describing the methodology of the aforedescribed embodiment, generally designated by the reference numeral 200.

Initially, a processing system, which exists in a camera as an initial part of an image processing pipeline, receives (S210) a digital image from an image sensor. At the same time, a dark frame corresponding to the digital image is also received.

The digital image and dark frame may be in a 12-bit mosaic format, where each pixel consists of a single word [0 . . . 4095] of information for each of the colors red, green, blue, and lightness. Typically, this raw data is in a mosaic pattern, such as Bayer format:

RGRGRG . . .
GBGBGB . . .

where the data representation is R=red, G=green, and B=blue. In other words, each pixel is under a different filter.

As described hereinabove, the dark frame is a digital image of darkness, generally taken by a digital camera while the shutter is closed or a lens cap is on, that depicts the location and brightness of the dark current in the digital camera.

The dark frame is subtracted from the digital image (S220) pixel-by-pixel. When the digital image and dark frame are in a 12-bit mosaic format, then each pixel may be represented in binary or hexadecimal notation, and the subtraction is performed bit-by-bit. Likewise, when the digital image and the dark frame are in other formats, the subtraction may be performed to have a similar effect. The subtracted image is stored in the corrected image memory 160.

After the dark frame is subtracted from the digital image, the resulting image is checked (S230) for anomalous pixel values. When the digital image and dark frame are in a 12-bit mosaic format, an anomalous pixel value is represented by negative bit values. It should be apparent to those skilled in the art that, because the pixel values are represented in binary, negative values must be represented in two's complement, sign-magnitude, or another notation. When the digital image and the dark frame are in another format, then anomalous pixel values are represented differently.

Several different checking methods may be used. One method is to compare the dark pixel value to a probability threshold. If the dark pixel value exceeds the threshold, then the pixel location is marked and stored in the marked pixel storage memory 150. If the dark pixel value is less than the threshold, then the subtracted image pixel value is set to zero. Another method of checking is to compare the light pixel value to a threshold value. If the light pixel value is higher than the threshold value, then the pixel location is marked and stored in the marked pixel storage memory 150. If the light pixel value is less than the threshold value, then the subtracted image pixel value is set to zero.

Not every pixel needs to be replaced using a pixel replacement algorithm. Replacing every pixel requires time and computation that is expensive on a camera, and, depending upon the replacement algorithm, introduces distortion in dark areas.

In any format, anomalous pixel values produce distortions in the digital image, and are corrected (S240) through any of several pixel replacement algorithms. Each marked pixel value stored in the marked pixel storage memory 150 is subjected to a pixel replacement filter, typically using neighboring pixel values. Several pixel replacement filters include median filters, nearest neighbor filters, edge detect filters, and averaging filters.

After the anomalous pixel values are replaced with corrected pixel values, the corrected image is stored (S250) in memory 160 and is available for further processing through the rest of the image processing pipeline.

In another embodiment of the present invention, another method for improving the dark frame subtraction algorithm is disclosed. A picture image and a dark frame image are received in digital camera software and the two images are subtracted pixel-by-pixel, the dark frame from the picture image. Each pixel value is checked, prior to subtraction, that the light pixel value is greater than the dark pixel value. If the light pixel value is greater than the dark pixel value, then the two pixel values are subtracted. If the light pixel value is less than the dark pixel value, then the pixel values are analyzed and marked or set to zero. After the dark frame subtraction, the marked pixels are replaced with values from a pixel replacement algorithm.

Figure 3:
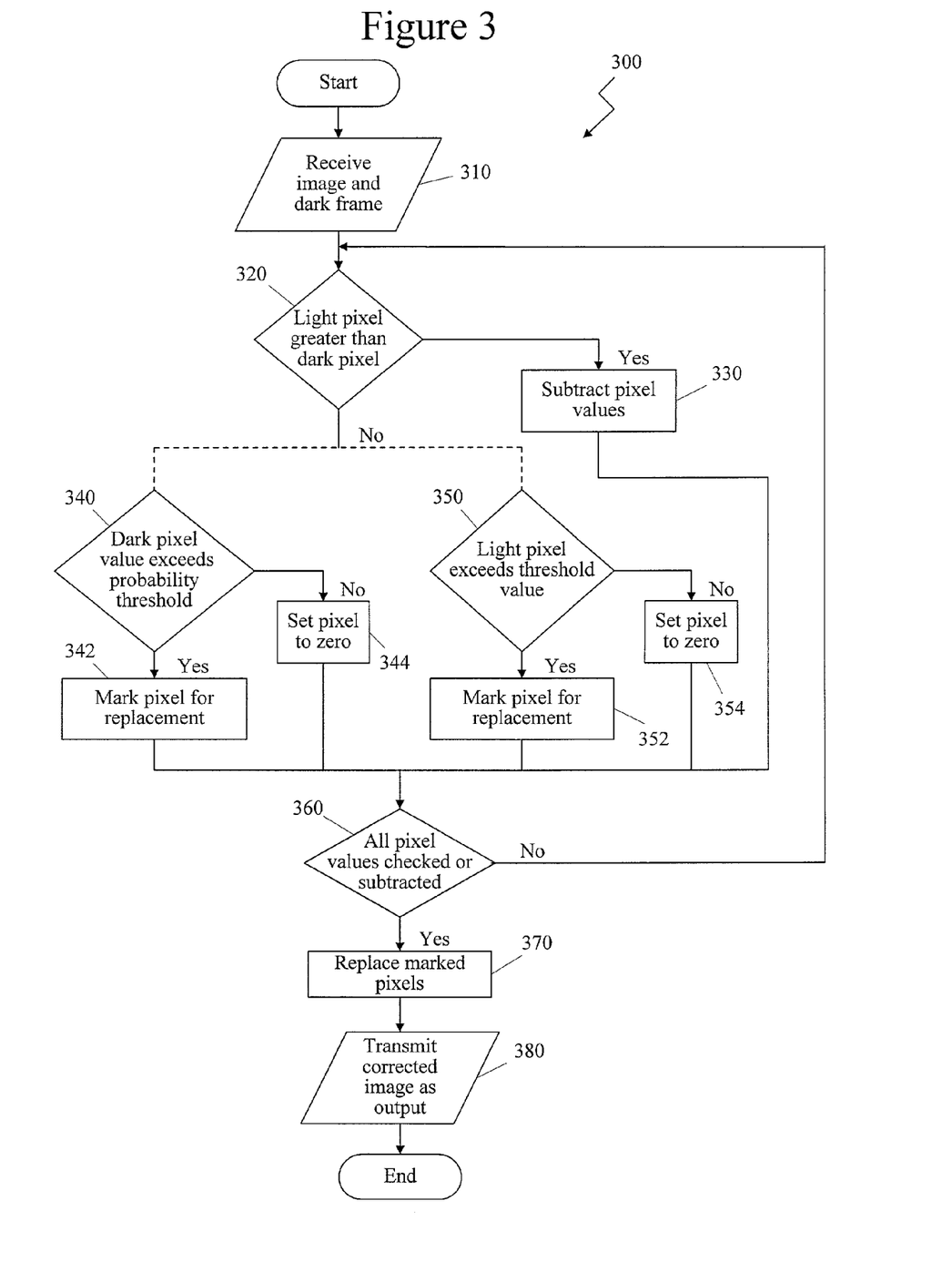
FIG. 3 depicts an alternative schematic flow chart of an alternative embodiment of the present invention.

With reference now to FIG. 3, there is illustrated a more complex flowchart describing another embodiment of the invention, generally designated by the reference numeral 300.

Initially, as in step 210 of FIG. 2, a processing system in a camera receives (S310) a digital image from an image sensor. At the same time, a dark frame corresponding to the digital image is also received.

Next, each dark and light pixel at each pixel location is checked (S320). When the light pixel value is greater than the dark pixel value, then the values are subtracted (S330) and the process is repeated. When the dark pixel value is greater than the light pixel value, then the values are checked according to one of two formulas. A benefit of checking the values before subtraction is that the difficulty of representing negative numbers in binary notation is avoided.

One formula (S340) is checking that if the dark pixel value exceeds a probability threshold, then the pixel location is marked (S342) and stored in the marked pixel storage memory 150. If the dark pixel value is less than the threshold, then the subtracted image pixel value is set to zero (S344).

The other formula (S350) is checking that if the light pixel value is higher than a threshold value, then the pixel location is marked (S352) and stored in the marked pixel storage memory 150. If the light pixel value is less than the threshold value, then the subtracted image pixel value is set to zero (S344).

After every pixel location has been checked (S360), subtracted, marked, or set to zero, then the marked pixel values are replaced. Each marked pixel value stored in the marked pixel storage memory 150 is subjected to a pixel replacement filter, as described hereinabove.

After the anomalous pixel values are replaced with corrected pixel values, the corrected image is stored (S350) in memory 150 and is available for further processing through the rest of the image processing pipeline.

Figure 4:
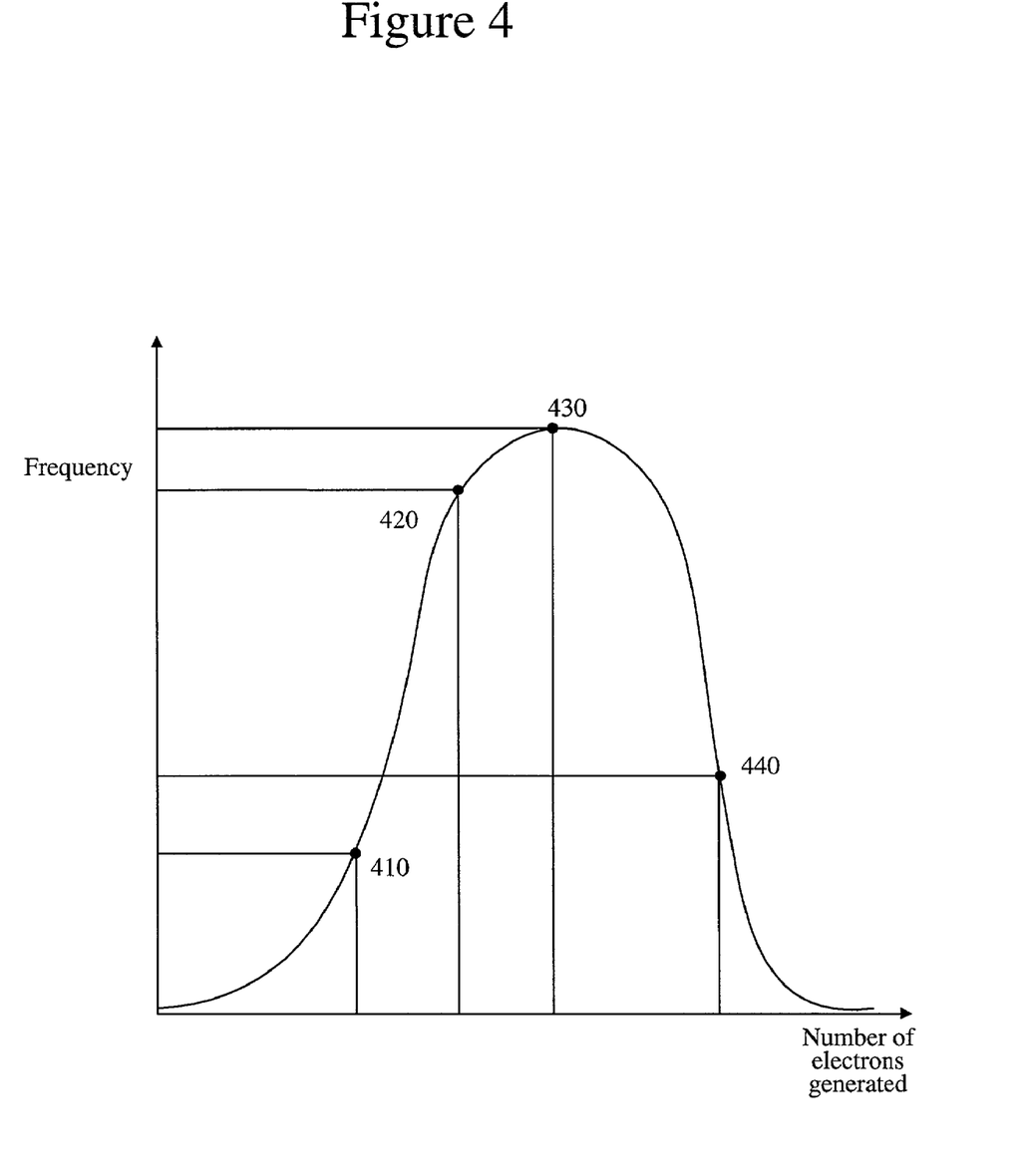
FIG. 4 depicts a Poisson distribution curve that illustrates the usefulness of the present invention.

With reference now to FIG. 4, there is illustrated a Poisson distribution curve that shows the significance of dark shot noise. The median value 430 shows that one dark current noise value occurs most frequently. If both the picture image and the dark frame have the median dark shot noise, then subtracting one from the other will yield a fully corrected picture image. When the picture image has a median dark current noise 430 and the dark frame has a slightly smaller dark shot noise 420, then dark frame subtraction will yield a mostly correct picture image. However, when the dark frame has a median dark shot noise 430 and the picture image has a slightly smaller dark current noise 420, then dark frame subtraction will yield a negative value and an invalid color value. When the dark shot noise of the dark frame is unusually high 440, and the dark shot noise of the picture image is unusually low 410, then subtracting one from the other also yields a negative value and an invalid color value.

In order to more fully illustrate the effects of dark frame subtraction and pixel replacement, several images are shown in FIGS. 5 through 8. Each image contains various pixels, where the value and color of each pixel is illustrated with cross-hatch marks. For purposes of illustration, the pixel values are described in decimal RGB format rather than binary mosaic format.

Figure 5:
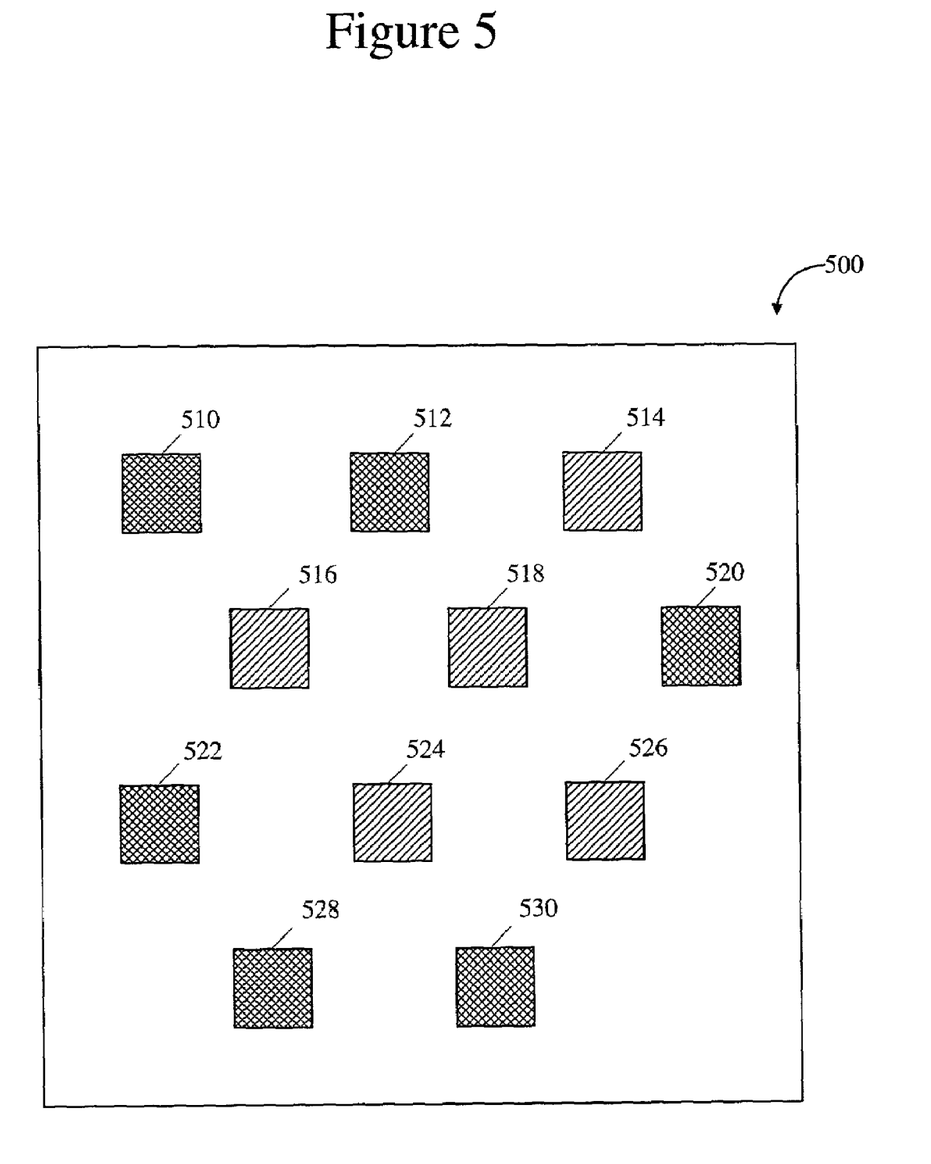
FIG. 5 depicts a night sky image with anomalous white spots.

With reference now to FIG. 5, there is illustrated a digital image, generally designated with the reference numeral 500. The digital image 500 is shown with various pixels, 510 to 530, and pixels 510 to 530 are of various pixel values and colors. For the purpose of illustration, each of the pixels 514, 516, 518, 524, and 526 is assigned the value [25 25 112] and the color dark blue, and each of the pixels 510, 512, 520, 522, 528, and 530 is assigned the value [240 255 240] and the color white. This digital image could be of stars in a night sky, where some of the white pixels 510, 512, 520, 522, 528, and 530 are stars and some are pixels with significant dark current noise that mimic the appearance of stars.

Figure 6:
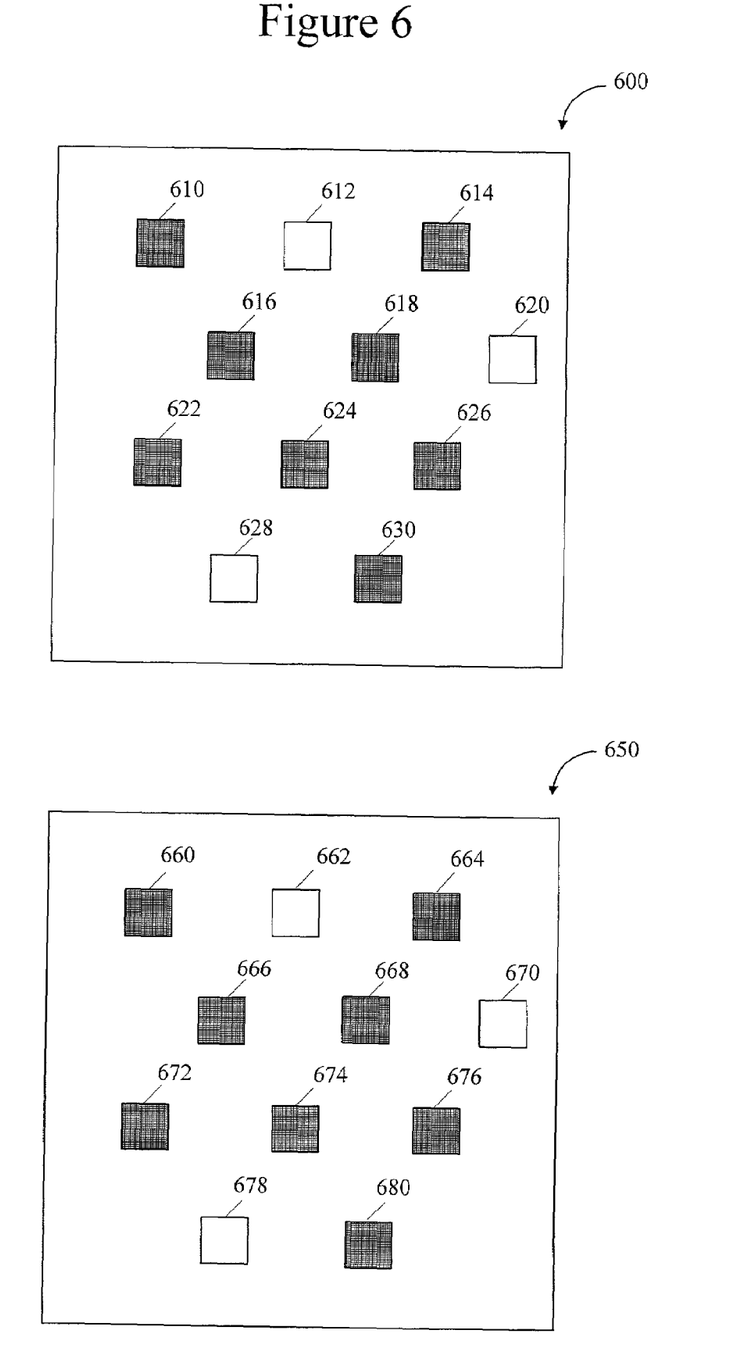
FIG. 6 depicts several dark frames with various dark shot noise levels.

With reference also to FIG. 6, there are illustrated several example dark frames, designated with the reference numbers 600 and 650. The dark frame 600 is shown with various pixels, 610 to 630. The pixels 612, 620 and 628 are assigned the values [245 255 255], [215 230 128] and [245 255 255], and the color white, respectively. The pixels 610, 614, 616, 618, 622, 624, 626, and 630 are assigned the value [0 0 0] and the color black. The pixels 612, 620 and 628 represent pixels in a dark frame with moderate dark shot noise, while the pixels 610, 614, 616, 618, 622, 624, 626, and 630 represent normal dark pixels in the dark frame. An alternate dark frame 650 with significant dark shot noise is shown with various pixels, 660 to 680. The pixels 662, 670 and 678 are assigned the values [215 230 128], [250 255 253] and [250 255 253], and the color white, respectively. The pixels 660, 664, 666, 668, 672, 674, 676, and 680 are assigned the value [0 0 0] and the color black. In this dark frame, the pixel 662 with a value of [215 230 128] is representative of a normal pixels with dark current noise, with no added dark shot noise. The pixels 670 and 678, however, are representative of pixels with significant added dark shot noise.

When the dark frame 600 is subtracted from the digital image 500, as in the dark frame subtraction method described in connection with FIG. 2, some of the pixels of the digital image 500 remain unchanged. These are the pixels at the locations of normal dark pixels 610, 614, 616, 618, 622, 624, 626, and 630 in the dark frame 600. It should be apparent that each normal pixel 514, 516, 518, 524, and 526 and 510, 522, and 530 of the digital image 500 retains its original pixel value and color of [25 25 112] and [240 255 240], and dark blue and white, respectively. Only the values of the pixels 512, 520, and 528 of the digital image 500 at the pixels with dark current noise 612, 620, and 628 in the dark frame 600 are changed. After subtraction, the pixel values become [–5 0 –15], [25 25 112], and [–5 0 –15] at the pixel locations with significant dark current noise 512, 522, and 528, respectively, of the digital image 500. Of these three values, only the pixel value [25 25 112] of pixel 512 is both valid and correct. The pixel value [–5 0 –15] of pixels 522 and 528 is invalid. When the dark subtraction methods as described in connection with FIG. 2 is used, the pixel value [–5 0 –15] of pixels 522 and 528 is found to be invalid and is replaced using any of the pixel replacement algorithms described hereinabove. When the surrounding pixel values of the pixels 522 and 528 are dark blue, then the value of pixels 522 and 528 is changed to match the neighboring pixel values and becomes [25 25 112].

Figure 7:
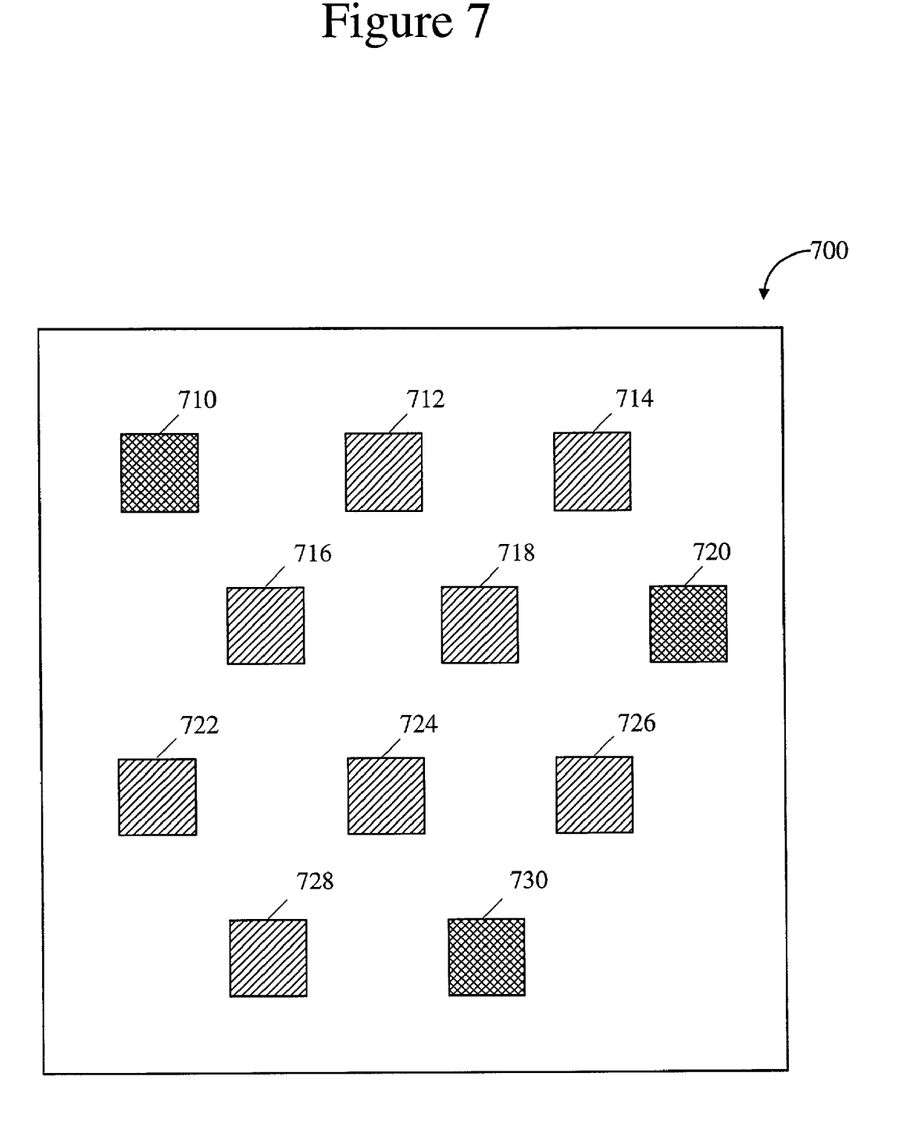
FIG. 7 depicts a result of a dark frame subtracted from the image of FIG. 5.

With reference now to FIG. 7, there is illustrated a resulting image designated by the reference numeral 700 of the improved implementation of dark frame subtraction as described in connection with FIG. 2. Each of the pixels 712, 714, 716, 718, 722, 724, 726, and 728 are represented by the value [25 25 112], and each of the pixels 710, 720 and 730 are represented by the value [240 250 240].

Alternatively, when the dark subtraction method as described in connection with FIG. 3 is used in connection with the dark frame 650 of FIG. 6, the pixel values of pixels 670 and 678 are found to be greater than the pixel values 52, and 528, i.e., [250 255 253] is greater than [240 255 240]. Checking the pixel values of pixels 520, 528, 670 and 678 against the dark pixel probability threshold of formula S340 and the light pixel threshold value of formula S350 indicates that the pixels 520 and 538 should be marked for replacement. As in the method described in connection with FIG. 2, the values of pixels 520 and 528 are changed to match the neighboring pixel values and become [25 25 112].

Figure 8:
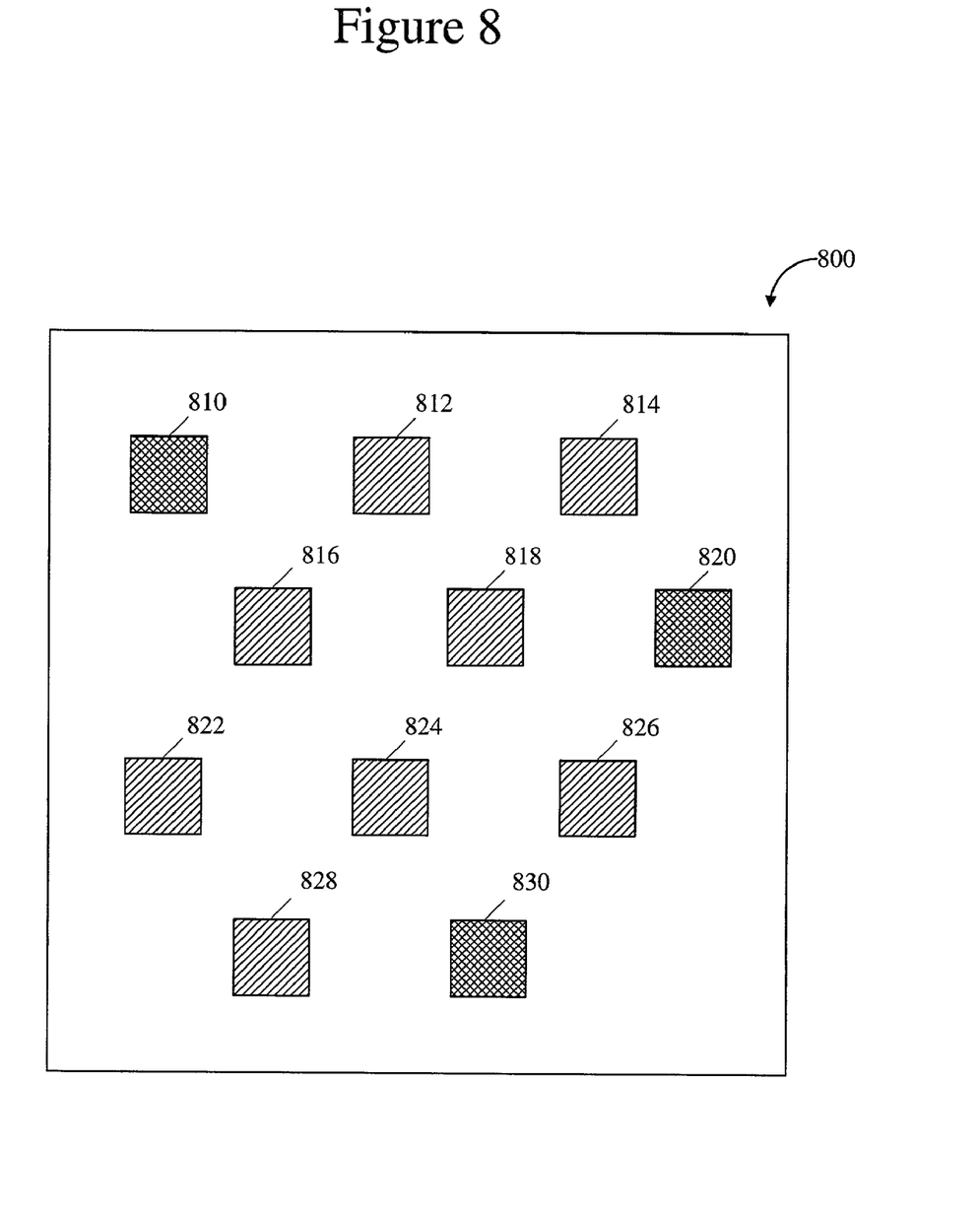
FIG. 8 depicts another result of a different dark frame subtracted from the image of FIG. 5.

With reference now to FIG. 8, there is illustrated a resulting image, generally designated by the reference numeral 800, of the improved implementation of dark frame subtraction as described in connection with FIG. 3. Each of the pixels 812, 814, 816, 818, 822, 824, 826, and 828 are represented by the value [25 25 112], and each of the pixels 810, 820 and 830 are represented by the value [240 250 240]. It should be apparent that each pixel represents a valid and correct color and value.

The usefulness of the dark frame subtraction methods described in connection with FIGS. 2 and 3 is clearly illustrated in FIGS. 5 to 8. The initial image 500 of a night sky has extra white spots caused by dark current which resemble stars and distort the image. By subtracting the dark frames 600 and 650 from the night sky image 500, the anomalous white spots are removed. The image is completely corrected and each of the pixels of the original image affected by dark current, with or without dark shot noise, is changed from a white value to a blue value. Thus, the corrected images 700 and 800 no longer contains anomalous white spots that mimic stars, and instead become correct night sky images.

The foregoing description of the present invention provides illustration and description, but is not intended to be exhaustive or to limit the invention to the precise one disclosed. Modifications and variations are possible consistent with the above teachings or may be acquired from practice of the invention. Thus, it is noted that the scope of the invention is defined by the claims and their equivalents.

What is claimed is:

1. A method for improving the quality of low-light images of a digital camera, said method comprising the steps of:
    receiving a low-light image and a dark frame, said low-light image and said dark frame having respective pixels therein, each said pixel having a respective pixel value associated therewith;
    subtracting respective pixel values of said dark frame from the corresponding pixel value of said low-light image, forming a resulting image therefrom having respective pixel values associated therewith;
    analyzing the respective pixel values of said resulting image for pixel values below a pixel threshold value, pixel values below said pixel threshold value constituting illegal pixels and pixel value at and above said pixel value threshold constituting legal pixel values;
    replacing respective illegal pixel values with respective legal pixel values according to a pixel replacement algorithm, wherein said pixel replacement algorithm compares a respective dark frame pixel value corresponding to the illegal pixel value with a probability threshold, forming a corrected resulting image therefrom; and
    outputting said corrected resulting image.

2. The method according to claim 1, wherein said pixel value threshold is zero and pixel values are illegal when said pixel values are negative.

3. The method according to claim 1, wherein in said pixel replacement algorithm, if the respective dark frame pixel value corresponding to the illegal pixel value is greater than the probability threshold, the corresponding pixel value within said corrected resulting image is replaced using a value from at least one adjacent pixel value.

4. The method according to claim 1, wherein in said pixel replacement algorithm, if the respective dark frame pixel value corresponding to the illegal pixel value is less than the probability threshold, the corresponding pixel value within said corrected resulting image is set to zero.

5. A method for improving the quality of low-light images of a digital camera, said method comprising the steps of:
    receiving a low-light image and a dark frame, said low-light image and said dark frame having respective pixels therein, each said pixel having a respective pixel value associated therewith;

subtracting respective pixel values of said dark frame from the corresponding pixel value of said low-light image, forming a resulting image therefrom having respective pixel values associated therewith;

analyzing the respective pixel values of said resulting image for pixel values below a pixel threshold value, pixel values below said pixel threshold value constituting illegal pixels and pixel value at and above said pixel value threshold constituting legal pixel values;

replacing respective illegal pixel values with respective legal pixel values according to a pixel replacement algorithm, forming a corrected resulting image therefrom; and outputting said corrected resulting image, wherein said pixel replacement algorithm compares a respective low-light image pixel value corresponding to the illegal pixel value with a threshold value, and wherein in said pixel replacement algorithm, if the respective low-light image pixel value corresponding to the illegal pixel value is greater than the threshold value, the corresponding pixel value within said corrected resulting image is replaced using a value from at least one adjacent pixel value, and wherein in said pixel replacement algorithm, if the respective low-light image pixel value corresponding to the illegal pixel value is less than the threshold value, the corresponding pixel value within said corrected resulting image is set to zero.

6. A method for improving the quality of low-light images of a digital camera, said method comprising the steps of:

receiving a low-light image and a dark frame, said low-light image and said dark frame having respective pixels therein, each said pixel having a respective pixel value associated therewith, wherein said dark frame contains pixel locations of pixels corresponding to significant dark current in said low-light image;

marking said dark frame for said pixel locations of said pixels corresponding to significant dark current in said low-light image, wherein said pixel locations are of pixels with significant dark current in said low-light image having pixel values lower than said pixels with significant dark current in said dark frame;

subtracting the unmarked dark frame pixels from said low-light image, forming a resulting image;

replacing the marked pixel values with pixel values according to a pixel replacement algorithm, forming a corrected resulting image, wherein said pixel replacement algorithm compares the dark frame pixel value at the marked pixel value location with a probability threshold; and outputting said corrected resulting image.

7. The method according to claim 6, wherein in said pixel replacement algorithm, if the dark frame pixel value at the marked pixel value location is greater than the probability threshold, the corresponding pixel value of the resulting image is replaced using a value from at least one adjacent pixel value, forming the corrected resulting image therefrom.

8. The method according to claim 6, wherein in said pixel replacement algorithm, if the dark frame pixel value at the marked pixel value location is less than the probability threshold, the corresponding pixel value of the resulting image is set to zero, forming the corrected resulting image therefrom.

9. A method for improving the quality of low-light images of a digital camera, said method comprising the steps of:

receiving a low-light image and a dark frame, said low-light image and said dark frame having respective pixels therein, each said pixel having a respective pixel value associated therewith, wherein said dark frame contains pixel locations of pixels corresponding to significant dark current in said low-light image;

marking said dark frame for said pixel locations of said pixels corresponding to significant dark current in said low-light image, wherein said pixel locations are of pixels with significant dark current in said low-light image having pixel values lower than said pixels with significant dark current in said dark frame;

subtracting the unmarked dark frame pixels from said low-light image, forming a resulting image;

replacing the marked pixel values with pixel values according to a pixel replacement algorithm, forming a corrected resulting image; and outputting said corrected resulting image, wherein said pixel replacement algorithm compares the low-light image pixel value at the marked pixel value location with a threshold value, and wherein if the low-light image pixel value at the marked pixel value location is less than the threshold value, the corresponding pixel value of the resulting image is set to zero, forming the corrected image therefrom.

10. The method according to claim 9, wherein in said pixel replacement algorithm, if the low-light image pixel value at the marked pixel value location is greater than the threshold value, the corresponding pixel value of the resulting image is replaced using a value from at least one adjacent pixel value, forming the corrected resulting image therefrom.

11. The method according to claim 9, wherein in said pixel replacement algorithm, if the low-light image pixel value at the marked pixel value location is less than the threshold value, the corresponding pixel value of the resulting image is set to zero, forming the corrected resulting image therefrom.

12. A digital camera for improving the quality of low-light images, said images formed from pixels, said digital camera comprising: a memory to store pixel values of an original picture image;

a memory to store pixel values of a dark frame associated with said original picture image;

a processor to subtract the pixel values of the dark frame from the pixel values of the original picture image, forming a subtracted image therefrom, to analyze the subtracted image for illegal pixel values, wherein said illegal pixel values are negative pixel values, and to replace the illegal pixel values according to a pixel replacement algorithm, wherein said pixel replacement algorithm compares a respective dark frame pixel value corresponding to the illegal pixel value with a probability threshold, forming a corrected image therefrom; and a memory to store the corrected image.

13. The camera according to claim 12 further comprising a memory to store illegal pixel locations.

14. A digital camera for improving the quality of low-light images, said images formed from pixels, said digital camera comprising:

a memory to store pixel values of an original picture image;

a memory to store pixel values of a dark frame associated with said original picture image;

a processor to subtract the pixel values of the dark frame from the pixel values of the original picture image, forming a subtracted image therefrom, to analyze the subtracted image for illegal pixel values, and to replace the illegal pixel values according to a pixel replacement algorithm, forming a corrected image therefrom; and a memory to store the corrected image, wherein said pixel replacement algorithm compares a respective dark frame pixel value corresponding to the illegal pixel value with a probability threshold and wherein in said pixel replacement algorithm, if the respective dark frame pixel value corresponding to the illegal pixel value is less than the probability threshold, the corresponding pixel value within said corrected resulting image is set to zero.

15. The camera according to claim 14, wherein in said pixel replacement algorithm, if the respective dark frame pixel value corresponding to the illegal pixel value is greater than the probability threshold, the corresponding pixel value within said corrected resulting image is replaced using a value from at least one adjacent pixel value.

16. A digital camera for improving the quality of low-light images, said images formed from pixels, said digital camera comprising: a memory to store pixel values of an original picture image;

a memory to store pixel values of a dark frame associated with said original picture image;

a processor to subtract the pixel values of the dark frame from the pixel values of the original picture image, forming a subtracted image therefrom, to analyze the subtracted image for illegal pixel values, and to replace the illegal pixel values according to a pixel replacement algorithm, forming a corrected image therefrom; and a memory to store the corrected image, wherein said pixel replacement algorithm compares a respective original picture image pixel value corresponding to the illegal pixel value with a threshold value and wherein in said pixel replacement algorithm, if the respective original picture image pixel value corresponding to the illegal pixel value is less than the threshold value, the corresponding pixel value within said corrected resulting image is set to zero.

17. The camera according to claim 16, wherein in said pixel replacement algorithm, if the respective original picture image pixel value corresponding to the illegal pixel value is greater than the threshold value, the corresponding pixel value within said corrected resulting image is replaced using a value from at least one adjacent pixel value.

* * * * *